Stiles, Jr & Crehore.
Bed Plate for Paper Mill Engine.
N° 22,707.   Patented Jan. 25, 1859.
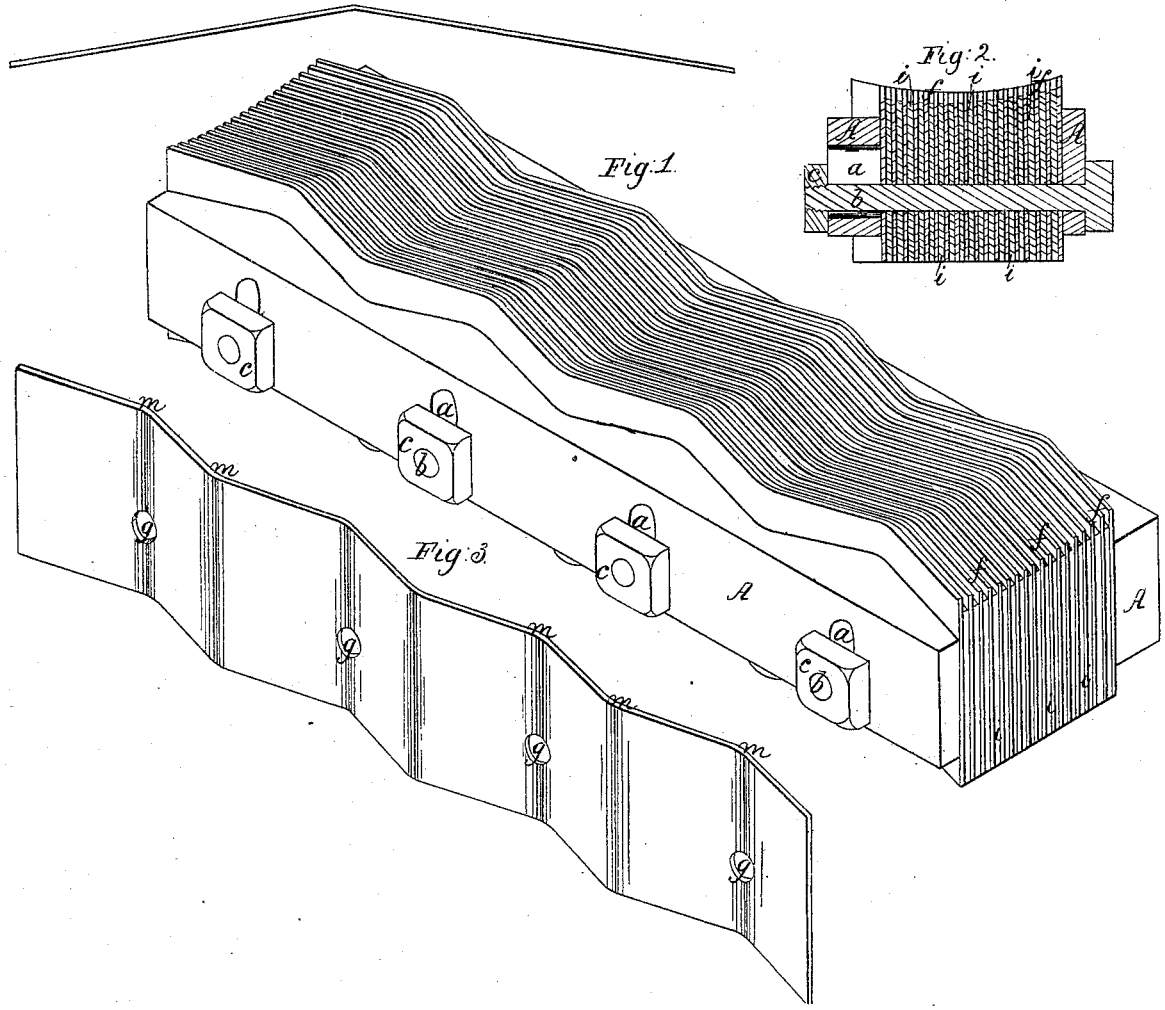

UNITED STATES PATENT OFFICE.

ISAAC N. CREHORE, OF BOSTON, AND FRANCIS STILES, JR., OF LEICESTER, MASSACHUSETTS.

IMPROVEMENT IN PAPER-RAG ENGINES.

Specification forming part of Letters Patent No. 22,707, dated January 25, 1859.

*To all whom it may concern:*

Be it known that we, ISAAC N. CREHORE, of Boston, in the county of Suffolk and State of Massachusetts, and FRANCIS STILES, Jr., of Leicester, in the county of Worcester and State aforesaid, have invented a new and useful Improvement in Bed-Plates for Paper-Mill Engines, of which the following is a full, clear, and exact description, reference being had to the accompanying drawings, making part of this specification, in which—

Figure 1 is a view of the improved bed-plate; Fig. 2, a transverse section through the same; Fig. 3, a detached view of one of the knives; Fig. 4 a plan, and Fig. 5 an elevation, of the same. Fig. 6 will be referred to hereinafter.

The knives or plates forming the "bed-plate" of paper-mill engines have heretofore been made of two planes forming an obtuse angle at the center of their length, as shown in Fig. 6, in order that the knives of the cutting-cylinders, when the latter are adjusted in their working position, may not enter into the spaces between those of the bed-plates, and also for the purpose of obtaining a more uniform and equable cut. This form of knife is, however, liable to the objection that it gathers the pulp or the fibrous portions of it into the center of the tub, thus giving the knives a greater amount of work near the middle of their length and tending to raise the cylinder away from the bed-plate at this portion of it and prevent the knives from operating near their ends. These objections we have remedied by forming the plates of which the bed-plate is composed with a series of angles throughout their length, instead of a single angle at the middle of their length as heretofore.

That others skilled in the art may understand and use our invention, we will proceed to describe the manner in which we have carried out the same.

In the drawings, A are two stout blocks having slots $a$, through which pass the bolts $b$, which are drawn up by nuts $c$. The plates $f$, formed as shown in Figs. 3, 4, and 5—that is, with a series of angles $m$ throughout their length—are arranged side by side between the blocks A, with washers $i$ of wood or other suitable material between them. The bolts $b$ pass through holes $g'$, Fig. 3, in the plates and through corresponding holes in the washers $i$, when by tightening up the nuts $c$ the whole is bound compactly together to form the bed-plate, as shown in Fig. 1. The plates $f$, as they approach the middle of the width of the bed-plate, decrease in their height gradually, as shown in Fig. 2, forming a concave surface on the bed-plate to correspond with the periphery of the knife-cylinder which operates upon it. The slots $a$ allow the plates to be adjusted to the cylinder as they become worn down. By thus forming the plates $f$ with a number of angles, as described, the pulp is kept distributed throughout the length of the bed-plate, and is prevented from accumulating near the middle of it. This form also gives greater stiffness to the plates and allows the use of thinner plates, giving them a better cutting-edge, and as the whole length of cylinder is effective the engine is enabled to do more work than it could with a bed-plate of the ordinary construction.

The plates, instead of being formed with angles, may be corrugated or waved throughout their length, and may be of any suitable material—brass, steel, iron, malleable iron, or of iron steel-laid—the separate knives being suitably secured together to form a solid bed-plate.

We are aware that a solid cast-metal bed-plate for paper-mill engines has been made having a series of diamond-shaped knives upon its surface, but such bed-plate is objectionable from its liability to breakage and the difficulty of repairing it when once injured or broken at any point. We do not, therefore, claim such device or any improvement upon solid cast-metal bed-plates; but What we do claim is—

A bed-plate composed of sheet-metal knives corrugated or formed with a series of angles or curved lines through their entire length, in the manner described, for the purpose specified.

I. N. CREHORE.
F. STILES, JR.

Witnesses:
SAM. COOPER,
P. E. TESCHEMACHER.